(12) United States Patent
Muthusamy et al.

(10) Patent No.: US 11,463,558 B2
(45) Date of Patent: Oct. 4, 2022

(54) TOOL PORT AWARE STATEFUL PROTOCOL VISIBILITY FOR PACKET DISTRIBUTION

(71) Applicant: Gigamon Inc., Santa Clara, CA (US)

(72) Inventors: Rakesh Muthusamy, Sunnyvale, CA (US); Dominick Cafarelli, Ossining, NY (US); Tushar Jagtap, Fremont, CA (US); Arunraj Mani, Tamil Nadu (IN)

(73) Assignee: Gigamon Inc., Santa Clara, CA (US)

( * ) Notice: Subject to any disclaimer, the term of this patent is extended or adjusted under 35 U.S.C. 154(b) by 0 days.

(21) Appl. No.: 17/183,106

(22) Filed: Feb. 23, 2021

(65) Prior Publication Data

US 2022/0272176 A1 Aug. 25, 2022

(51) Int. Cl.
*H04L 69/04* (2022.01)
*H04L 67/02* (2022.01)
*H04L 45/74* (2022.01)

(52) U.S. Cl.
CPC .............. *H04L 69/04* (2013.01); *H04L 45/74* (2013.01); *H04L 67/02* (2013.01)

(58) Field of Classification Search
CPC .......... H04L 69/04; H04L 45/74; H04L 67/02
See application file for complete search history.

(56) References Cited

U.S. PATENT DOCUMENTS 10,999,188 B1 * 5/2021 Cafarelli ................. H04L 45/02
11,044,204 B1 * 6/2021 Matthews ............. H04L 45/121
11,075,847 B1 * 7/2021 Kwan .................... H04L 47/283
2002/0174203 A1 * 11/2002 Kuhn ....................... H04L 45/00
709/220
2006/0075134 A1 * 4/2006 Aalto ...................... H04L 69/04
709/238
2006/0129689 A1 * 6/2006 Ho ........................ H04L 69/329
709/230

(Continued)

OTHER PUBLICATIONS

Karaagac, Abdulkadir, Eli De Poorter, and Jeroen Hoebeke. "In-band network telemetry in industrial wireless sensor networks." IEEE Transactions on Network and Service Management 17.1 (2019): 517-531.*

(Continued)

*Primary Examiner* — Jimmy H Tran
(74) *Attorney, Agent, or Firm* — Perkins Coie LLP (57) ABSTRACT

At least one technique for distributing traffic from a visibility node to a network tool is disclosed. In certain embodiments, the visibility node has a tool port through which to receive a plurality of packets which each include a compressed header. The visibility node determines, for each packet, whether a given network tool has received the compressed header in decompressed format based on a header-to-tool mapping structure. The structure includes information indicative of which packet headers each of the plurality of network tools have received in decompressed format. If the visibility node determines that the tool previously received the decompressed header, the visibility node transmits the packet to the network tool in compressed format. If the visibility node determines that the tool has not previously received the decompressed header, the visibility node decompresses the compressed header prior to transmitting the packet to the given network tool.

20 Claims, 7 Drawing Sheets

(56) References Cited

U.S. PATENT DOCUMENTS

| | | | |
|---|---|---|---|
| 2007/0201462 A1* | 8/2007 | Ilan | H04L 47/2441 370/389 |
| 2007/0274286 A1* | 11/2007 | Krishnan | H04W 28/06 370/351 |
| 2009/0213726 A1* | 8/2009 | Asati | H04L 45/28 370/216 |
| 2010/0329256 A1* | 12/2010 | Akella | H04L 12/4625 370/392 |
| 2011/0122893 A1* | 5/2011 | Kang | H04L 69/22 370/477 |
| 2011/0128975 A1* | 6/2011 | Kang | H04L 65/765 370/477 |
| 2013/0205002 A1* | 8/2013 | Wang | H04L 69/16 709/224 |
| 2014/0143442 A1* | 5/2014 | Vange | H04L 69/08 709/238 |
| 2015/0263949 A1* | 9/2015 | Roch | H04L 45/34 370/392 |
| 2016/0021224 A1* | 1/2016 | Howe | H04L 63/02 370/474 |
| 2017/0302552 A1* | 10/2017 | Ward | H04L 12/2803 |
| 2018/0302323 A1* | 10/2018 | Moiseenko | H04L 45/306 |
| 2019/0116521 A1* | 4/2019 | Qiao | H04L 69/04 |
| 2019/0140957 A1* | 5/2019 | Johansson | H04L 47/741 |
| 2019/0149421 A1* | 5/2019 | Jin | H04W 36/125 370/331 |
| 2019/0149437 A1* | 5/2019 | Hegde | H04L 43/12 370/252 |
| 2019/0149469 A1* | 5/2019 | Surcouf | H04L 45/7453 370/392 |
| 2019/0166020 A1* | 5/2019 | Mommileti | H04L 43/026 |
| 2019/0281495 A1* | 9/2019 | Wu | H04L 45/745 |
| 2020/0287824 A1* | 9/2020 | Dutta | H04L 45/20 |
| 2020/0380121 A1* | 12/2020 | Pasricha | G06F 21/71 |
| 2020/0394066 A1* | 12/2020 | Senthil Nayakam | H04L 12/4625 |
| 2021/0266385 A1* | 8/2021 | Lu | H04L 69/24 |
| 2022/0021678 A1* | 1/2022 | Kreger-Stickles | H04L 47/18 |
| 2022/0038560 A1* | 2/2022 | Kim | H04L 69/04 |
| 2022/0141752 A1* | 5/2022 | Miao | H04L 45/54 370/328 |

OTHER PUBLICATIONS

Zhang, Yan, et al. "On wide area network optimization." IEEE Communications surveys & tutorials 14.4 (2011): 1090-1113.*

Briscoe, Bob, et al. "Reducing internet latency: A survey of techniques and their merits." IEEE Communications Surveys & Tutorials 18.3 (2014): 2149-2196.*

* cited by examiner

FIGURE 5 ion in the drawings, in which like references may indicate similar elements.
TOOL PORT AWARE STATEFUL PROTOCOL VISIBILITY FOR PACKET DISTRIBUTION

TECHNICAL FIELD

At least one embodiment of the present disclosure pertains to techniques to providing network traffic to a network tool, and more particularly, to a technique for providing application aware and load balanced network traffic to the network tool.

BACKGROUND

Network communications traffic may be acquired at numerous entry points on a network by one or more devices called network "visibility nodes" to provide extensive visibility of communications traffic flow. These network visibility nodes, which may include physical devices, virtual devices, and/or Software Defined Networking (SDN)/Network Function Virtualization (NFV) environments, may be collectively referred to as the computer network's "visibility fabric." Various kinds of network tools are commonly coupled to such visibility nodes as part of a visibility fabric and used to monitor and/or control network traffic in the computer network, etc. Examples of such tools include a network monitoring system or an application monitoring system. The network visibility nodes are typically used to route network traffic (e.g., packets) to and from one or more connected network tools for these purposes. Examples of network visibility nodes suitable for these purposes include any of the GigaVUE® series and/or GigaSMART® series of visibility appliances available from Gigamon® Inc. of Santa Clara, Calif.

Network visibility fabrics can be used with many different kinds of computer networks. One such type of network is a core network of a wireless telecommunications system. In the Long Term Evolution (LTE) telecommunications system, the core network is called the Evolved Packet Core (EPC). LTE was followed by the introduction of LTE-Advanced (LTE-A), which has since been followed by the introduction of the Fifth Generation (5G) technology. Each of these wireless telecommunications systems includes a core network, which may include a visibility fabric containing one or more visibility nodes. Recent advancements in wireless telecommunications technology, including but not limited to 5G, present various technical obstacles to implementing a visibility fabric in a wireless telecommunications system's core network.

BRIEF DESCRIPTION OF THE DRAWINGS

Various features of the technology will become apparent to those skilled in the art from a study of the Detailed Description in conjunction with the drawings. Embodiments of the technology are illustrated by way of example and not limitat FIG. 1 includes a high-level illustration of a network architecture showing a 5G core network that includes a visibility fabric.

DETAILED DESCRIPTION

As described in detail below, the technique introduced here involves reducing the instances in which a network visibility node needs to decompress or decode header values in packets that it receives, before forwarding those packets to network tools that are connected to the network visibility node. In certain embodiments, this is accomplished by the network visibility node maintaining an "awareness" of which header values have already been sent to which tools. This "awareness" may be manifested in the form of a header-to-tool (or header-to-tool port) mapping structure that the network visibility node maintains. Among other advantages, this technique allows reduces the amount of data traffic between the visibility node and the tools that it supports, and reduces the processing load in the network visibility node in connection with header decompression.

Overview

The introduction of 5G presents certain technical challenges to implementing a visibility fabric in its core network. For example, in 5G networks, data compression may be applied to the packets that traverse the core network. The compression techniques can include various coding schemes that can be applied to the entire packet or portions of a packet, such as Huffman encoding. With Huffman encoding, one or more headers of any given packet may be replaced by a Huffman code, which is shorter than the original header. While such compression can improve performance, it also can complicate the interoperability of a network visibility node and the network tools that it supports.

Further, with the introduction of HyperText Transfer Protocol (HTTP) version 2 (HTTP/2) and control and user plane separation (CUPS) in wireless core networks, the communication between network nodes in a core network has changed. Under HTTP/2, there are two significant changes. First, one TCP connection (also referred to as "session") can carry data from many subscribers. In other words, the traffic between end points on a TCP connection is multiplexed. Multiplexing occurs by segmenting a packet into independent frames, then interleaving the segments for reassembly on the other end. As a result, there can be multiple parallel streams for any given subscriber. While this type of multiplexing provides a performance improvement, it also complicates the interoperability of network visibility node and the network tools that it supports. Second, due to there being data from multiple subscribers on one TCP connection, the data must be demultiplexed to identify the subscribers to which each packet belongs. The network tools need to identify the subscriber associated with each packet in order to perform various task(s) on those packets.

Note that while the techniques introduced here are described in the context of a 5G core network, these techniques are not necessarily limited in applicability to 5G networks, nor even to wireless telecommunications. Hence, the techniques introduced here are potentially applicable in technology areas beyond those described herein.

Another set of issues arises based on the access network on which a network system is being applied. For instance, 5G requires encryption between interfaces and uses HTTP/2. In a network visibility fabric, this leads to the additional requirement of decrypting the data prior to applying other techniques (e.g., techniques implemented by network tools attached to a visibility node). Moreover, 5G also separates control traffic and user traffic through CUPS. Thus, prior to transmission, the control traffic and user traffic need to be correlated. As such, a network visibility node may need to decrypt the data, demultiplex the data, and correlate the data prior to transmission to a network tool. In some cases, some of the techniques mentioned above can be performed by the network tool. For instance, the network tool may also be capable of correlating the data upon receipt.

Yet another issue arises due to the compression techniques that can be applied prior to transmission to a network tool. A network node in a 5G core network, for example, can apply Huffman coding schemes to reduce the traffic load. However, upon receipt of a Huffman-coded packet, the network tool needs to be able to decode the packet. In particular, the network tool needs to able to decode the header of each packet to read information in it, such as subscriber information. Thus, a network visibility node that supports one or more tools in a network visibility fabric needs to avoid distribution of encoded traffic to a network tool that is not capable of decoding a packet.

Introduced here, therefore, is at least one technique by which a network visibility node can load balance traffic to network tools while also being aware of which network tools have the associated information needed to decode an encoded packet, and to adjust its communications with the network tools accordingly. Note that in the context of this description, "compression" and "decompression" are particular types of "encoding" and "decoding", respectively (with the same relationship applying to other forms of these terms). For example, a data packet can be compressed by applying a Huffman encoding algorithm. Similarly, a data packet can be decompressed by decoding the packet based on Huffman encoded values.

The technique includes a tool port aware visibility node. That is, the visibility node becomes aware of which tools can decode (e.g., can decompress) an encoded (e.g., compressed) packet and in particular, the header of a packet. To do so, the visibility node can maintain a header-to-tool mapping structure which indicates the specific tools that it supports have already seen which specific header values. Based on the information in the header-to-tool mapping structure, the visibility node can determine whether a header of particular packet needs to be decoded (e.g., decompressed) prior to transmission to a tool. Note that in at least some embodiments, the aforementioned mapping structure may map headers to tool ports of the visibility node (specifically, egress ports to which tools are connected), rather than to the connected tools per se. Hence, the term "headers-to-tool mapping structure" is used only as an example to facilitate description.

In at least some embodiments, a visibility node and the network tools that it supports each locally maintain a static table and a dynamic table. In particular, each node that implements HTTP/2, including the visibility node and each network tool connected to it, maintains its own static table and dynamic table, for indexing compressed headers. The static table includes a list of common HTTP/2 header values and their corresponding encodings (compressed values). The dynamic table can be initially empty and updated based on values exchanged between the visibility node and network tool. In particular, the dynamic table is updated based on newly transferred header fields.

For example, if a network tool receives a new packet with a header whose decoded value is not indexed in its dynamic table already, the network tool can encode the header value and store the encoded value and its decoded value in the dynamic table. Thus, when a subsequent packet arrives at the network tool with the same encoded header value, the network tool can refer to its dynamic table to obtain the decoded value. In this manner, over time, a network tool can develop its dynamic table to include more encoded values. Due to the visibility node's awareness of which particular header values have already been seen by which particular network tools (by virtue of its header-to-tool mapping structure), the visibility node can avoid having to decompress, or decode the Huffman encoded value for each packet, prior to transmitting the packet to the tool. That is, the visibility node can forward a packet to the appropriate network tools without first decoding a given header in the packet, when the header-to-tool mapping structure that the visibility node maintains indicates the tool has already received at least one packet with the corresponding unencoded value of that header. This awareness results in reduced traffic between the visibility node and the tools.

If, on the other hand, the network tool has not received a header value before, the header-to-tool mapping structure at the visibility node will indicate this fact. Accordingly, in this case the visibility node determines, based on its header-to-tool mapping structure, that the header of a data packet must be decompressed (e.g., decoded) prior to transmission to the tool. In this case, the tool will receive a decompressed header and the tool can, for example, read the header to determine the subscriber information. If the data packet was not decompressed prior to transmission, the tool would not be able to read the compressed packet since the compressed packet contains encoded values which the tool cannot decompress.

Figure 1:
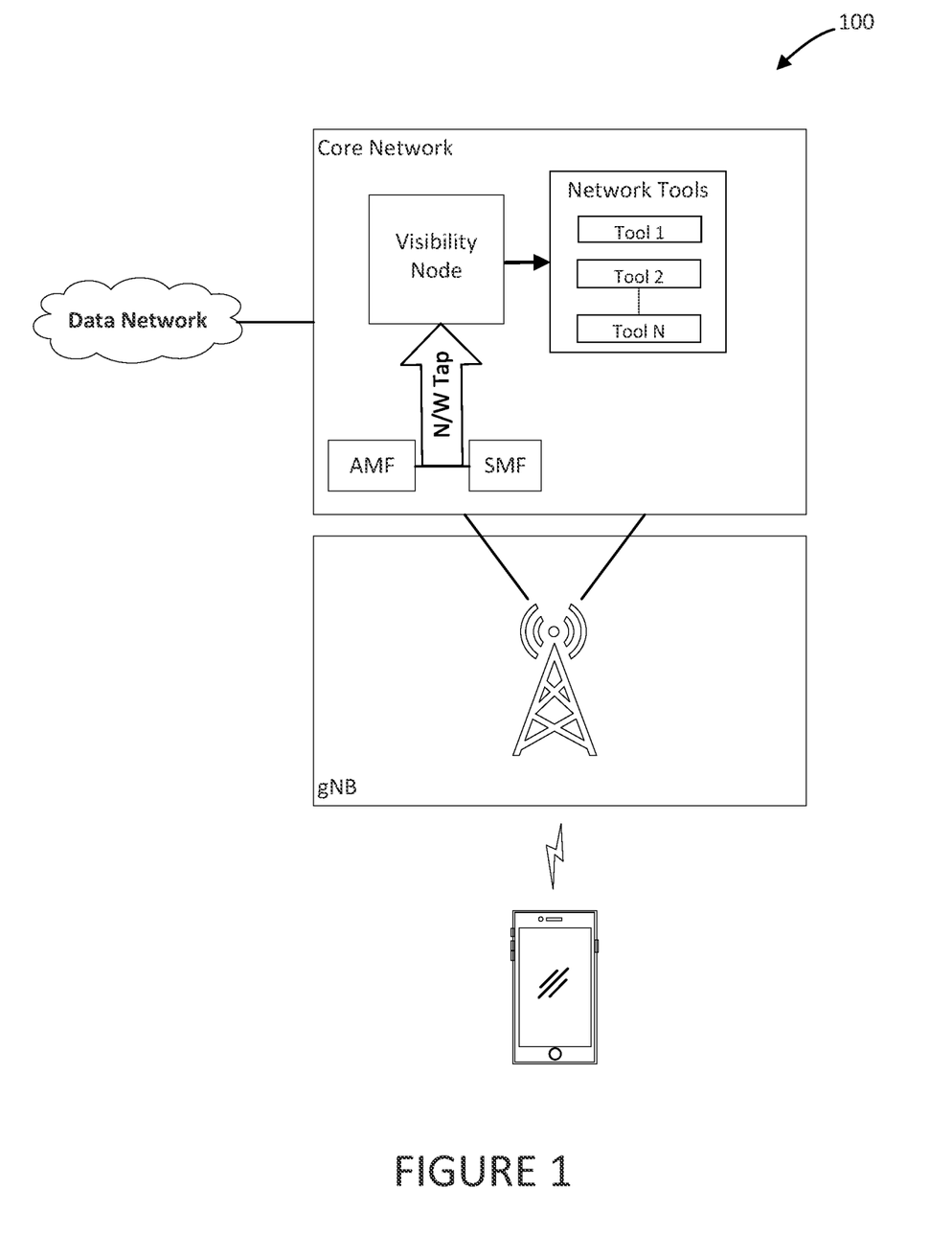

FIG. 1 includes a high-level illustration of a network architecture 100 showing how a visibility node can be connected to a 5G core network. In particular, FIG. 1 shows a 5G network which includes a core network in which a visibility node can tap traffic in support of one or more network tools. As shown in FIG. 1, the exemplary components of the 5G core network include (1) an access and mobility function (AMF) that receives all connection and session related information from the user equipment (UE); (2) a session management function (SMF) that receives all messages related to session management; and (3) an AMF-SMF interface through which the AMF and SMF interact. The visibility node can tap the AMF-SMF interface to pull data packets.

Upon pulling data packets from the AMF-SMF interface, the visibility node performs at least some of the tasks described in more detail below. For example, the visibility node determines which tool(s) should receive each packet that is pulled from the AMF-SMF interface. Note that although FIG. 1 depicts the visibility node and the network tools as part of the core network, this does not mean that they are essential to the core network. Rather, the visibility node and the network tools support the 5G core network.

The following description describes embodiments implemented in conjunction with 5G technology for illustrative purposes only. However, it should be noted, that various other technologies and/or access networks can implement the techniques described herein. For example, technologies such as 2G, 3G, WLAN, WiMAX, and Long-Term Evolution (LTE), LTE-Advanced (LTE-A) can also implement the techniques described herein.

Figure 2:
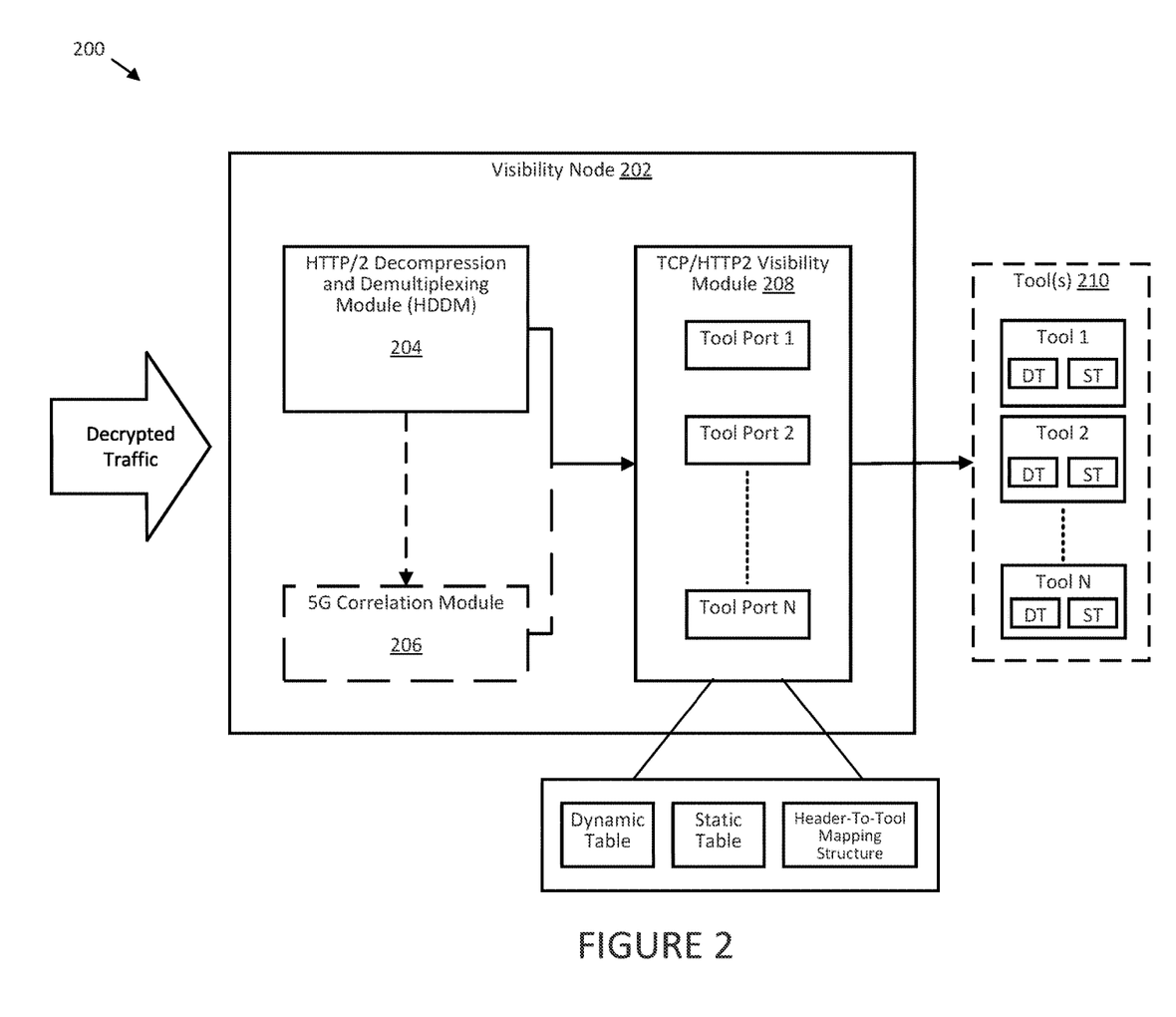
FIG. 2 depicts an example of a system that processes packets for transmission to one or more network tools.

FIG. 2 depicts an example of a network visibility node 200 that processes packets for transmission to network tool(s). The network visibility node 200 includes visibility node 202, HTTP/2 decompression and demultiplexing module ("HDDM") 204, TCP/HTTP2 Visibility Module ("visibility module") 208, and tool(s) 210. Optionally, the network visibility node 200, based on the access network being used, can include 5G correlation module 206.

Initially, the traffic that is received by the visibility node 202 can be encrypted traffic obtained from a network tap, as shown in FIG. 1. For example, the encrypted traffic can be pulled from a 5G network tap and subsequently, the encrypted traffic can be passed to a decryption engine. The decryption engine can be integrated within a network visibility node 200. The network visibility node 200 can be, for example, a GigaVUE® series visibility appliance available from Gigamon® Inc. of Santa Clara, Calif. The decryption engine, similarly, can be an element of a GigaSMART® series processing engine available from Gigamon® Inc. of Santa Clara, Calif.

After the traffic is decrypted, the traffic can be sent to visibility node 202. In some embodiments, such as in a 5G core network, the transmission of the traffic from the decryption engine to the visibility node 202 can occur over a single TCP session using HTTP/2. The traffic can include data from multiple subscribers that is multiplexed for transmission. As such, the visibility node 202 can receive decrypted and multiplexed traffic for multiple subscribers over a single TCP session using HTTP/2.

For example, a 5G network tap pulls traffic from six subscribers. The traffic is segmented into traffic packets, with each packet including multiple headers, where each header contains a value string. The traffic is multiplexed, and the packets are segmented for distribution to a visibility node. The segmented traffic is interleaved and transmitted between the decryption engine and visibility node in any order. For example, the header information from one subscriber is transmitted after the data information from another subscriber and before the header information of another subscriber. In FIG. 2, the visibility node 202 receives segmented, interleaved, and multiplexed packets from the six subscribers on a single TCP session.

Upon receipt of the traffic, the HDDM 204 decompresses and demultiplexes the traffic. If the network visibility node 200 is operating in 5G technology, the decompressed and demultiplexed traffic is transmitted to the 5G correlation module 206. However, if the network visibility node 200 is operating in another technology, the 5G correlation module 206 can be replaced with another appropriate module or omitted.

The 5G correlation module 206, if present, correlates the control traffic and user traffic with the corresponding subscribers. As mentioned above, in 5G and HTTP/2 the traffic is segmented and interleaved prior to transfer. Before a network tool can process the traffic, the packets that make up the traffic need to be re-associated with the corresponding subscriber. This re-association process is called "correlation." The 5G correlation module 206, therefore, can perform correlation by, for example, sampling and whitelisting the traffic.

For example, the 5G correlation module 206 samples packets based on a specified criterion in or criteria, which may be or include particular header values, a time interval, a number of received packets, or other sampling criteria.

During sampling, the 5G correlation module 206 samples, for example, every other packet. In another example, 5G correlation module 206 can sample a packet every other nanosecond. Based on the results of the sampling, the traffic is correlated to a subscriber. For example, the 5G correlation module 206 may receive a stream of twelve packets that belong to three subscribers. The first four packets to arrive at the 5G correlation module 206 may belong to a first subscriber, the next four packets may belong to a second subscriber, and the last four packets may belong to a third subscriber. The 5G correlation module 206 can sample every other packet that it receives. Thus, the 5G correlation module 206 can sample the first, third, fifth, seventh, ninth, and eleventh packet to determine the subscribers to which the packets belong. The 5G correlation module 206 can, then, infer the subscribers to whom the packets that were not sampled belong. For instance, the 5G correlation module 206 can infer that because the first packet belongs the first subscriber, and the fourth packet belongs to the second subscriber, the second and third packets belong to the first subscriber.

Further, traffic can be whitelisted based on, for example, the contents of the packet, the results of sampling, or other information. For example, the 5G correlation module 206 may be programmed to correlate packets with a certain subscriber based on internet protocol (IP) address. The 5G correlation module 206 can, for instance, reference a list of IP addresses that are mapped to subscribers. From the list, the 5G correlation module 206 can correlate an IP address in a packet to a subscriber, and thereby, also correlate the packet with the subscriber. After the traffic is correlated, the traffic can be transmitted to the visibility module 208.

In some embodiments, the HDDM 204 directly transfers decompressed and decrypted traffic to the visibility module 208. In general, the purpose of the visibility module 208 is to route received data traffic to the appropriate network tool(s). Additionally, in accordance with the techniques introduced here, the visibility module 208 can determine whether to decompress a packet prior to transmission to a network tool 210 via an associated tool port. As briefly discussed, above, the determination of whether to decompress a packet is based on the header-to-tool mapping structure that includes a log of coded header values that were previously transmitted to a network tool. Further, a static table (ST) and a dynamic table (DT) containing the coded values and the associated decoded values can be maintained by both the sender and recipient (e.g., visibility module 208 and each tool in tool(s) 210, respectively).

In general, each HTTP/2 packet includes a set of headers containing metadata related to the packet. To reduce this overhead and improve performance, HTTP/2 can require compression of header values using compression techniques such as Huffman coding.

The visibility module 208 maintains or accesses one or more routing policies, which it uses to determine the tool to which to send any given received packet. Additionally, in accordance with the technique introduced here, the visibility module 208 maintains a header-to-tool mapping structure to keep track of which particular header values each particular tool 210 previously received in encoded (e.g., compressed) form from the visibility node. If a particular tool previously received a packet that contained a particular header value in decoded form, that implies that the tool already has that header value in its own dynamic table and therefore can decode the encoded header value on its own (otherwise, it cannot). Therefore, when the visibility module 208 receives a new packet, if the visibility module 208 determines that a given header value in the packet is not associated in its header-to-tool mapping structure with the tool that requires that packet, the visibility module 208 will first decode that header value, then replace the encoded header value in the packet with the decoded header value, and then transmit the packet with the decoded header value to the appropriate tool that requires that packet. This process is done for each tool that requires the packet. Each header value in each packet received by the visibility node is evaluated in this manner prior to forwarding the packet to the relevant tool(s), and this evaluation is done separately for each tool port of the visibility node.

In instances where the visibility node determines from its header-to-tool mapping structure that the network tool has already received the header value in decompressed form, the packet can be sent from the visibility module 208 to the network tool without first decompressing the header value. In this manner, subsequent encoded values that are identical to previously encoded and transferred values can be found by the network tool in its local dynamic table. Thus, the network tool can reconstruct the full header values from the values stored in its local dynamic table. In other words, the transmission between the visibility module 208 and tool(s) 210 can remain compressed, if the local dynamic table at the tool has indexed values to look up the associated decoded value.

In instances where the visibility module 208 determines, based on its header-to-tool mapping structure, that a network tool does not have coded values in the local dynamic table of the tool, the visibility module 208 can decode the header and transmit a decoded packet with decoded header to the network tool. Prior to transmission to a network tool, the visibility module 208 can determine and store the encoded value of at least the header fields. Similarly, upon receipt of the decoded packet, the network tool can encode at least the header value and store the encoded header value and the associated decoded header value in its local dynamic table. Thus, in subsequent instances when the visibility module 208 receives a packet containing an identical value for that header, the visibility module 208 can transmit the packet to the network tool without decoding the header value.

In some embodiments, the visibility node 200 maintains a single header-to-tool-mapping structure that tracks the headers sent to each of the connected tools. For example, the single header-to-tool-mapping structure can be a table including one row for each header value, and a separate column for each tool (or each tool egress port) that the visibility module 208 transmits packets to. In other embodiments, the visibility module 208 maintains a separate header-to-tool-mapping structure for each tool 210. For example, in FIG. 2, there are "N" tool ports, which can be associated with an "N" number of tool(s) 210. As such, the visibility module 208 can maintain "N" number of header-to-tool-mapping structures. Alternatively, the visibility module 208 can maintain fewer than "N" header-to-tool-mapping structures which include information regarding the tool(s) 210. For example, the visibility module 208 may be connected to 10 different tools 210. In that case, the visibility module 208 can include 10 different header-to-tool-mapping structures, with each header-to-tool-mapping structure being associated with a different one of the 10 tools 210. Or, the visibility module 208 can include fewer than 10 header-to-tool-mapping structures, with a mapping of the indexed values in each header-to-tool-mapping structure to one of the 10 tools 210.

Example Data Communication Between AMF and SMF

Figure 3A:
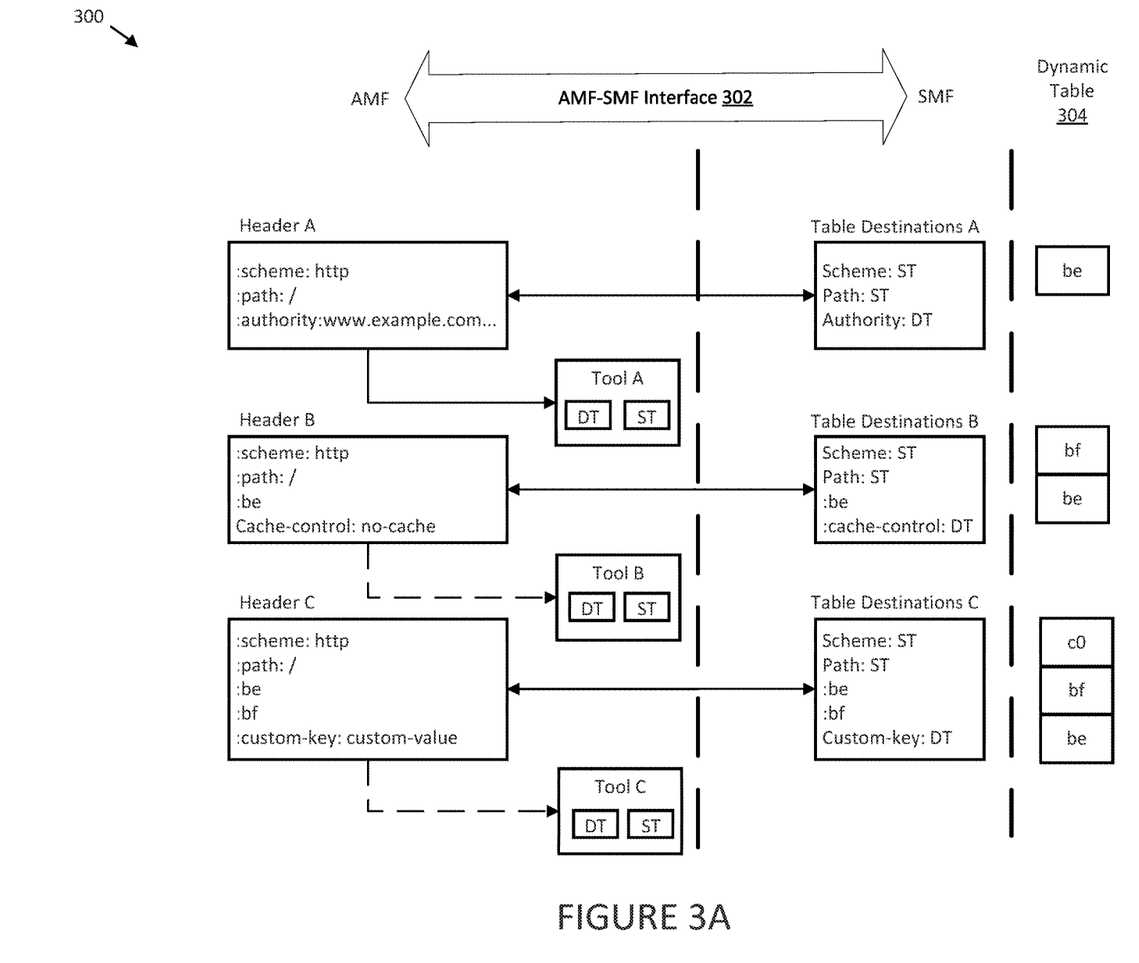
FIG. 3A illustrates an example of communication between a visibility node and one or more network tools.

FIG. 3A illustrates an example 300 of communication between networks nodes and network tool(s). Example 300 includes three illustrative headers and associated packets that are traversing an AMF-SMF interface 302 in a 5G core network, which is tapped by a visibility node such as visibility node 202. Example 300, in some embodiments, can illustrate the communication that can occur within visibility module 208 of FIG. 2. Although not shown in FIG. 3A, each of the Headers, A, B, and C can be from different subscribers or from the same subscriber. The traffic can be input to the HDDM 204 of visibility node 202 and optionally be fed to the 5G correlation module 206, as shown in FIG. 2.

Header A includes three header fields: scheme, path, and authority. Assuming Header A belongs to the first packet being transferred on this TCP session, the header-to-tool mapping structure at the visibility node is empty. As such, the visibility node decompresses the values. Upon successful decompression, the visibility node can determine that the scheme and path values of Header A have been indexed in the static table of the visibility node, as shown in Table Destinations A. These values are prestored in the static table because, for example, they may be common values that are often included in the static table. Thus, the static table at the tool can also contain the coded values for scheme and path. The tool can, thus, refer to its static table when it receives Header A. The authority value is indexed in the dynamic table 304 of the visibility node. The dynamic table 304 of the visibility node is updated with the Huffman encoded value of the authority header value, which in this example is "be". Subsequently, the packet including Header A s transferred to Tool A. Tool A also maintains and updates its own static table (ST) and dynamic table (DT), in a similar fashion with similar values. To do so, Tool A, upon receipt of Header A, applies its local Huffman encoding algorithm to the authority field and stores the encoded value and associated decoded value in its local dynamic table.

Next, Header B includes four header fields: scheme, path, the Huffman encoded value for authority, and cache control. Header B is indexed similar to Header A. Scheme and path can be found in the static table of the visibility node, which authority can be found in the dynamic table 304 of the visibility node. The cache control value, because it is new, has its Huffman encoded value added to the dynamic table 304 of the visibility node as "bf". Subsequently, as indicated by the dotted arrows, the packet including Header B can be transmitted to Tool B. The dynamic table at Tool B does not include the Huffman encoded value for authority ("be"), since Tool B has not previously seen that header value. Because of this, Tool B will fail to decompress Header B. However, if the packet including header value "be" was instead transmitted to Tool A, Tool A would be able to decompress header value "be" to its decoded value. Tool A could have also updated its local dynamic table to include the Huffman encoded value for cache control. Accordingly, the packet transmitted to Tool A can include the Huffman encoded value for authority and decoded value for cache control. As mentioned above, upon receipt, the Tool A can encode and store the cache control for future reference in its local dynamic table.

To continue the example 300, Header C includes five header fields: scheme, path, the Huffman encoded values for authority and cache control, and custom key. As described above, the Huffman encoded value of custom key can be indexed in the dynamic table 304 at the visibility node as "c0". The other values can remain indexed in the static or dynamic table 304 of the visibility node. Again, if Header C is transmitted without decompression to Tool C, Tool C will fail to decompress the Header C because Tool C has not previously seen that header and thus, is not aware of the Huffman encoded values for authority or cache control. However, if both Header A and Header B were transmitted to Tool A, and subsequently Header C was transmitted to Tool A, Tool A would be able to decompress the payload.

As more packets are tapped from the AMF-SMF interface 302, the header fields will likely start to repeat themselves. For example, although not shown in FIG. 3, a fourth packet may arrive with three header fields: scheme, path, and authority. Thus, the headers of this packet can remain compressed when it is sent to Tool A 304C, because scheme and path are stored in the static table and Tool A 304C has updated the local dynamic table to include the Huffman encoded value for authority.

Accordingly, the static and dynamic tables of the visibility node and the tools are updated and maintained by the visibility node and the tools, respectively. Moreover, the header-to-tool mapping structure at the visibility node is updated to reflect which tools have received which header values. Thus, based on the header-to-tool mapping structure a packet can be transmitted in a compressed or decompressed manner to a tool.

Figure 3B:
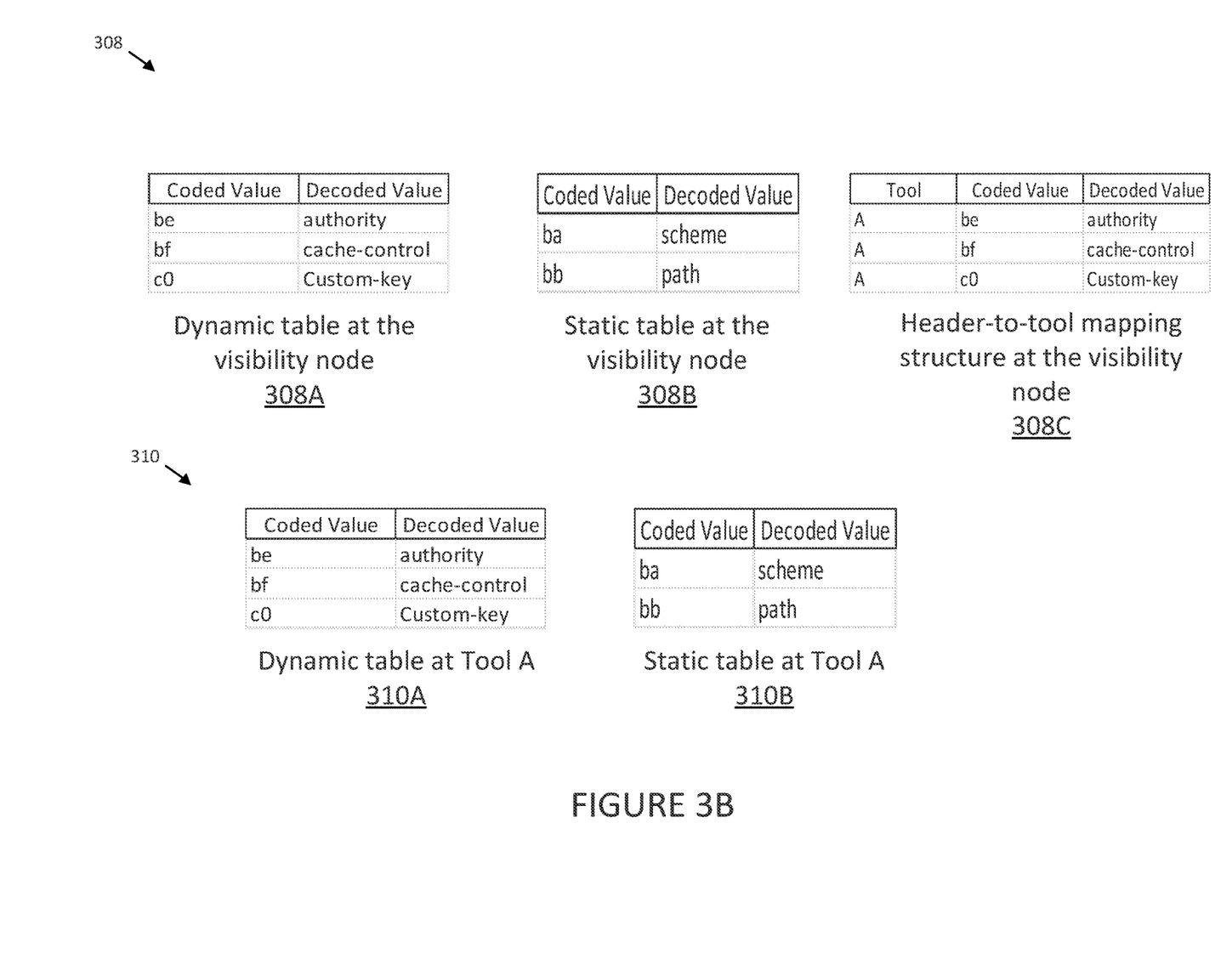
FIG. 3B illustrates an example of the information indexed during communication between a visibility node and a network tool.

FIG. 3B illustrates an example of the information indexed during communication between the visibility node and a network tool. FIG. 3B is best understood in reference to FIG. 3A. FIG. 3B illustrates an example of the resulting data structures 310 and 312 at the visibility node and Tool A, respectively, when the packets including Headers A, B, and C are transmitted to Tool A. As mentioned above, the dynamic table of the visibility node is initially empty. The static table, conversely, includes commonly coded values and corresponding decoded values. The header-to-tool mapping structure 308C at the visibility node is empty until a packet is transmitted to a tool.

When a packet containing Header A is transmitted to Tool A, the dynamic table at the visibility node 308A is updated with the coded value "be" and corresponding decoded value "authority". As mentioned above, because this is the first transmission to Tool A, the Header A is decompressed, and the decompressed value is substituted for the compressed value in the packet before the packet is transmitted to Tool A. Tool A, upon receipt of the packet containing Header A, updates its dynamic table 310A to include the coded value "be" and the corresponding decoded value "authority". Also, the visibility node updates its header-to-tool mapping structure 308C to indicate that Tool A knows the coded value "be".

As such, when the packet containing Header B 306A is received by Tool A, Tool A obtains the decoded value of "be" from its dynamic table 310A. Tool A also updates its dynamic table 310A to include the coded value "bf" and the corresponding coded value "cache-control". Further, the visibility node updates its header-to-tool mapping structure 308C to indicate that Tool A knows "bf". In this manner, the coded value from Header C, "c0", is indexed by the visibility node and Tool A. As mentioned herein, the header-to-tool mapping structure 308C at the visibility node can include data from other tools. For instance, although not shown in FIG. 3A, the header-to-tool mapping structure 308C at the visibility node can include additional rows for Tool B and Tool C.

Figure 3C:
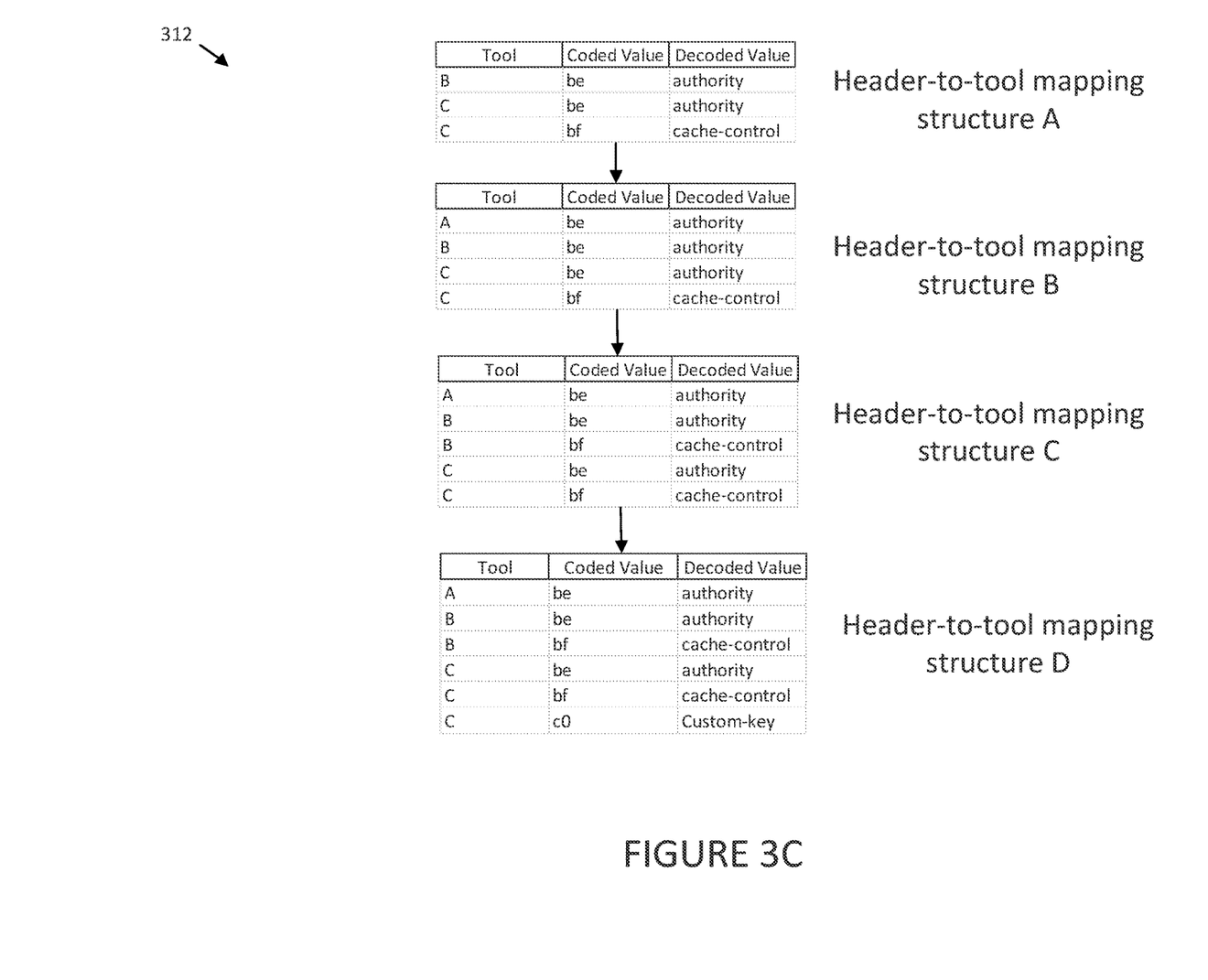
FIG. 3C illustrates an example of a header-to-tool mapping structure with multiple header values corresponding to multiple tools.

FIG. 3C illustrates an example of a header-to-tool mapping structures with multiple header values corresponding to multiple tools. FIG. 3C is best understood in reference to FIG. 3A. In this example, header-to-tool mapping structure A illustrates that Tool B has previously received the authority header value and that Tool C has previously received the authority and cache-control header values.

First, as in FIG. 3A, the packet including Header A is transmitted to Tool A. The packet includes a decompressed value of authority and upon receipt, Tool A will update its local dynamic table with "be". Thus, the header-to-tool mapping structure 312A indexes that Tool A has received "be", as shown in header-to-tool mapping structure B. Next, the packet including Header B is transmitted to Tool B. Here, because header-to-tool mapping structure B indicates that Tool B has previously received the header value "be", the visibility node transmits the compressed value "be". In other words, the visibility node sends a packet including Header B with the compressed header value "be" and decompressed value for cache-control to Tool B. Tool B, upon receipt, can encode the cache-control and update its local dynamic table. The visibility node also updates the header-to-tool mapping structure B to header-to-tool mapping structure C to indicate that Tool B can now decompress the compressed value for cache-control.

Similarly, the packet including Header C is transmitted to Tool C. Since header-to-tool mapping structure C indicates that Tool C has previously received the authority and cache-control header value, the visibility node compresses those values prior to transmission to Tool C. The custom-key, however, is decompressed prior to transmission to Tool C. Upon receipt, Tool C encodes the cache-control and updates its dynamic table. The visibility node updates the header-to-tool mapping structure C to header-to-tool mapping structure D to reflect that Tool C can now decompress the compressed value for custom-key.

Exemplary Methodology

Figure 4:
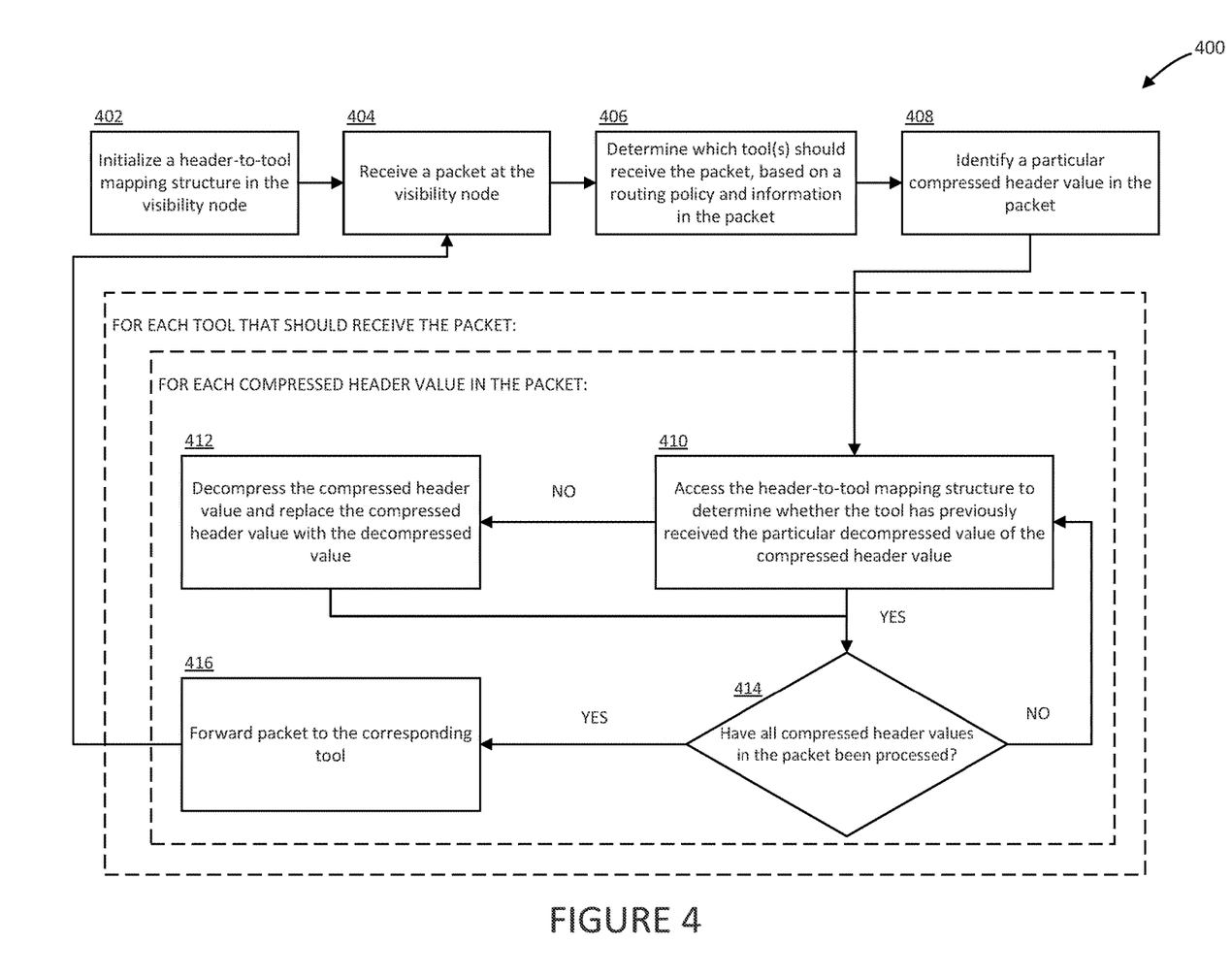
FIG. 4 is a flow diagram illustrating an example of a process by which a visibility node can transmit data packets to a network tool.

FIG. 4 is a flow diagram illustrating an example of a process 400 by which a visibility node can transmit data packet(s) to a network tool. Further, the process 400 can be implemented on a single TCP session using HTTP/2 and for traffic (e.g., packets) from multiple subscribers. The traffic can include, for example, data from video, IMS voice, and Internet data. Further, the process 400 can be implemented by a visibility node comprising a plurality of network ports, a plurality of tool ports through which to communicate to a plurality of network tools, a storage device, and processor circuitry.

At block 402, the visibility node initializes a header-to-tool mapping structure. For example, the visibility node can initialize a header-to-tool mapping structure when a new TCP session is opened. At block 404, the visibility node receives a packet via one of its network ingress ports. At block 406, the visibility node determines which tool(s) should receive the packet, based on a routing policy and information in the packet (e.g., header information). For instance, the header of the packet may contain an IP address, and the routing policy may say that a packet associated with the IP address must be routed to a particular tool. The visibility node, therefore, determines that the packet should be routed to the particular tool or tools. Next, at block 408, the visibility node identifies a particular compressed header value in the packet (if any).

The following steps are performed for each tool that should receive the packet and for each compressed header value within the packet. At block 410, the visibility node accesses the header-to-tool mapping structure to determine whether the tool has previously received the particular decompressed value of the compressed header value. For example, if the compressed header value is found in the visibility node's header-to-tool mapping structure in association with that tool (or with the tool port corresponding to that tool), that means the tool has previously received the particular decompressed value of the compressed header value; otherwise, it has not. If the tool has not previously received the particular decompressed value of the compressed header value, the visibility node, at block 412, decompresses the compressed header value and replaces the compressed header value with the decompressed value. For example, as described in FIGS. 3A-C, prior to transmitting Header A to Tool A, the visibility node decompressed the authority value. The visibility node did so because the header-to-tool mapping structure indicated that Tool A had not previously seen the compressed header value for authority.

Once the compressed header value is replaced or if the tool has previously received the particular decompressed value of the compressed header value, the visibility node determines, at block 414, whether all the compressed header values in the packet have been processed. Here, a compressed header value is deemed to be processed when the logic described at block 410 has been applied to the compressed header value. If all the compressed header values in the packet have not been processed, the visibility node returns to block 410 to perform the associated logic on the next compressed header value.

Once all the compressed header values in the packet have been processed, the visibility node forward the packet to the corresponding tool at block 416. Subsequently, the visibility node returns to block 404. In this manner, the visibility node processes each packet within a single TCP session based on a header-to-tool mapping structure.

Processing System Architecture

Figure 5:
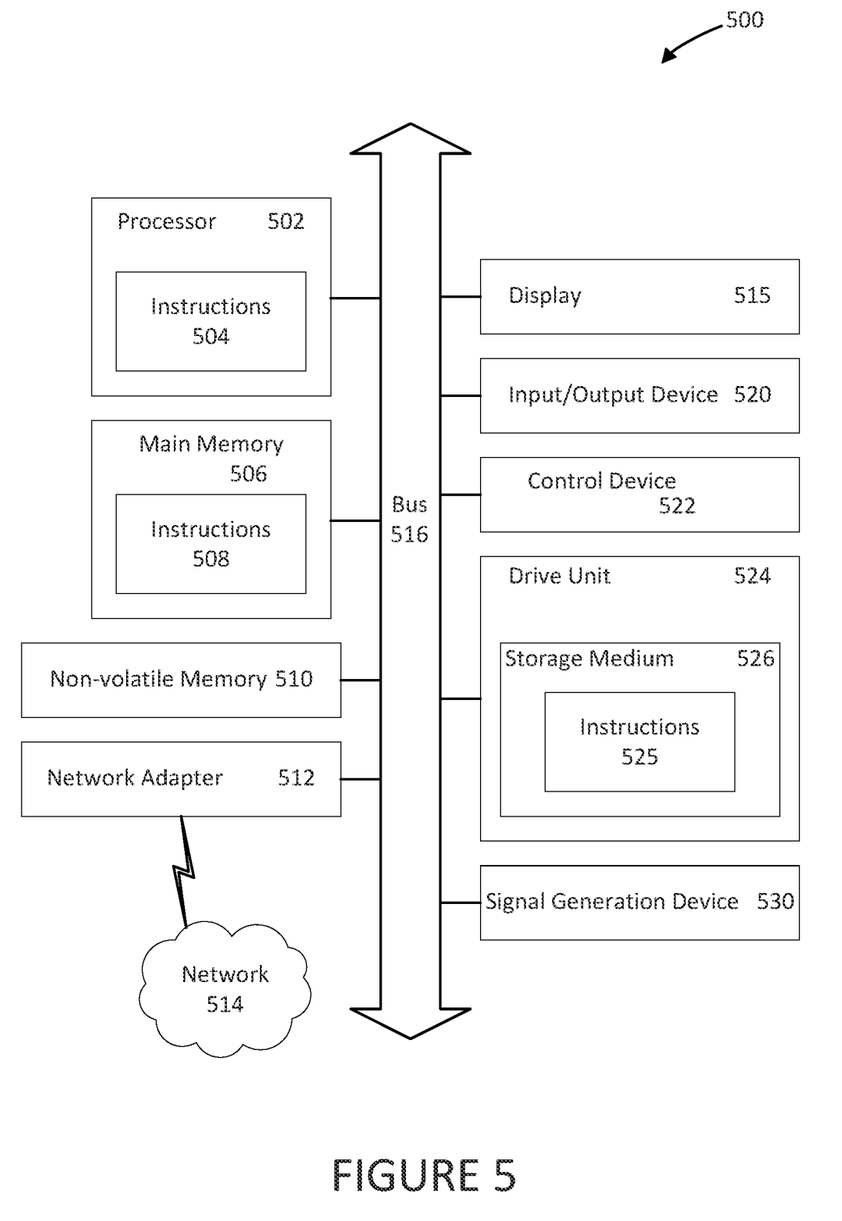
FIG. 5 includes a block diagram illustrating an example of a processing system in which at least some operations described herein can be implemented.

FIG. 5 includes a block diagram illustrating an example of a processing system 500 in which at least some operations described herein can be implemented. For example, processing system 500 may be an example implementation of a network visibility node that may implement the techniques introduced above. Note that in at least some embodiments, a visibility node implementing the techniques introduced here may be partially or fully virtualized. At least a portion of the processing system 500 may be included in an electronic device (e.g., a computer server) that supports one or more (Control Plane Nodes) CPNs and/or one or more (User Plane Noes) UPNs. The processing system 500 may include one or more processors 502, main memory 506, non-volatile memory 510, network adapter 512 (e.g., network interfaces), display 518, input/output devices 520, control device 522 (e.g., keyboard and pointing devices), drive unit 524 including a storage medium 526, and signal generation device 530 that are communicatively connected to a bus 516. The bus 516 represents any one or more separate physical buses, point to point connections, or any combination thereof, connected by appropriate bridges, adapters, or controllers. The bus 516, therefore, can include, for example, a system bus, a Peripheral Component Interconnect (PCI) bus or PCI-Express bus, a HyperTransport or industry standard architecture (ISA) bus, a small computer system interface (SCSI) bus, any version of a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of a network appliance, such as a switching engine, network port(s), tool port(s), etc.

In various embodiments, the processing system 500 operates as a standalone device, although the processing system 500 may be connected (e.g., wired or wirelessly) to other devices. For example, the processing system 500 may include a terminal that is coupled directly to a network appliance. As another example, the processing system 500 may be wirelessly coupled to the network appliance.

In various embodiments, the processing system 500 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the processing system 500.

While the main memory 506, non-volatile memory 510, and storage medium 526 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 528. The term "machine-readable medium" and "storage medium" shall also be taken to include any medium that is capable of storing, encoding, or carrying a set of instructions for execution by the processing system 500 and that cause the processing system 500 to perform any one or more of the methodologies of the presently disclosed embodiments.

In general, the routines that are executed to implement the technology disclosed above may be implemented as part of an operating system or an application, component, program, object, module, or sequence of instructions (collectively referred to as "computer programs"). The computer programs typically comprise one or more instructions (e.g., instructions 504, 508, 528) set at various times in various memory and storage devices in a computer, and that, when read and executed by one or more processing units or processors 502, cause the processing system 500 to perform operations to execute elements involving the various aspects of the above disclosure.

Moreover, while embodiments have been described in the context of fully functioning computers, computer systems and/or other devices, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 510, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 512 enables the processing system 500 to mediate data in a network 514 with an entity that is external to the processing system 500, such as a network appliance, through any known and/or convenient communications protocol supported by the processing system 500 and the external entity. The network adapter 512 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 512 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination of such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

EXAMPLES OF CERTAIN EMBODIMENTS

Certain embodiments of the technology introduced herein are summarized in the following numbered examples:

1. A network visibility node comprising: a network port through which to receive a plurality of packets from at least one entity external to the visibility node, wherein each of the plurality of packets includes a compressed header; a plurality of tool ports through which to communicate data with a respective plurality of network tools, wherein at least a portion of each packet of the plurality of packets is to be forwarded to at least one network tool of the plurality of network tools; a storage device storing a mapping structure indicative of which packet headers, if any, each of the plurality of network tools has received; and processor circuitry configured to maintain the mapping structure and for each packet of the plurality of packets, determine, prior to transmitting the packet to a particular network tool of the plurality of network tools, whether to decompress a compressed header of the packet based on the mapping structure indicative of which packet headers, if any, each of the plurality of network tools has received.

2. The network visibility node of example 1, wherein the processor circuitry is further configured to, for each packet: determine, based on the mapping structure, that the compressed header of the packet has not been received by a given network tool of the plurality of network tools; and upon determining that the compressed header of the packet has not been received by the given network tool of the plurality of network tools, replace the compressed header with a decompressed header prior to transmitting the packet to the given network tool of the plurality of network tools.

3. The network visibility node of example 1, wherein the processor circuitry is further configured to, for each packet: determine, based on the mapping structure, that the compressed header of the packet has been received by a given network tool of the plurality of network tools; and upon determining that the given packet header has been received by the given network tool of the plurality of network tools, transmit the packet to the given network tool of the plurality of network tools, wherein the packet includes the compressed header.

4. The network visibility node of claim 1, wherein the processor circuitry is further configured to, for a first packet and a second packet of the plurality of packets: determine, based on the mapping structure, that the compressed header of the first packet has not been received by a given network tool of the plurality of network tools and that the compressed header of the second packet has been received by the given network; upon determining that the compressed header of the first packet has not been received by the given network tool, replace the compressed header of the first packet with a first decompressed header prior to transmitting the first packet to the given network tool; and upon determining that the compressed header of the second packet has been received by the given network tool, transmit the second packet to the given network tool, wherein the second packet includes a second compressed header.

5. The network visibility node of example 1, wherein the plurality of packets is communicated in a transmission control protocol (TCP) session using hypertext transfer protocol (HTTP) version two (HTTP/2).

6. The network visibility node of any of example 1 and 5, wherein the plurality of packets is received during a single TCP session.

7. The network visibility node of example 1, wherein the plurality of packets is from a plurality of subscribers.

8. The network visibility node of example 1, wherein the mapping structure is further indicative of which packet headers, if any, each of the plurality of tools ports has received.

9. The network visibility node of example 8, wherein the processor circuitry is further configured to, for a first packet and a second packet of the plurality of packets: determine, based on the mapping structure, that the compressed header of the first packet has not been received by a given tool port of the plurality of tool ports and that the compressed header of the second packet has been received by the given tool port; upon determining that the compressed header of the first packet has not been received by the given tool port, replace the compressed header of the first packet with a first decompressed header prior to transmitting the first packet to the given tool port; and upon determining that the compressed header of the second packet has been received by the given tool port, transmit the second packet to the given tool port, wherein the second packet includes a second compressed header.

10. A system comprising: a plurality of network ports through which to receive a plurality of packets, wherein each of the plurality of packets includes a compressed header; a plurality of tool ports through which to communicate data with a respective plurality of network tools, wherein at least a portion of each packet of the plurality of packets is to be forwarded to at least one network tool of the plurality of network tools; a storage device storing a mapping structure indicative of which packet headers, if any, each of the plurality of network tools has received; and processor circuitry configured to maintain the mapping structure and for each packet of the plurality of packets, the processor circuitry further configured to: determine, based on the mapping structure, whether the compressed header of the packet has been received by a given network tool of the plurality of network tools; and upon determining that the given packet header has been received by the given network tool of the plurality of network tools, transmitting the packet to the given network tool of the plurality of network tools, wherein the packet includes the compressed header; or upon determining that the compressed header of the packet has not been received by the given network tool of the plurality of network tools, replace the compressed header with a decompressed header prior to transmitting the packet to the given network tool of the plurality of network tools.

11. The system of example 10, wherein the plurality of packets is from a plurality of subscribers.

12. The system of any of examples 10 and 11, wherein the processor circuitry is further configured to apply a Huffman coding scheme to the values.

13. A method comprising: receiving a plurality of packets at a visibility node, via a network port of a plurality of network ports of the visibility node, the visibility node having a plurality of tool ports through which to communicate data with a respective plurality of network tools, wherein each of the plurality of packets includes a compressed header, and wherein at least a portion of each packet of the plurality of packets is to be forwarded to at least one network tool of the plurality of network tools; maintaining, by the visibility node, a mapping structure indicative of which packet headers, if any, each of the plurality of network tools has received; and for each packet of the plurality of packets, determining, by the visibility node prior to transmitting the packet to a particular network tool of the plurality of network tools, whether to decompress a compressed header of the packet based on the mapping structure indicative of which packet headers, if any, each of the plurality of network tools has received.

14. The method of example 13, further comprising: determining, based on the mapping structure, that the compressed header of the packet has been received by a given network tool of the plurality of network tools; and upon determining that the given packet header has been received by the given network tool of the plurality of network tools, transmitting the packet to the given network tool of the plurality of network tools, wherein the packet includes the compressed header.

15. The method of example 13, further comprising: determining, based on the mapping structure, that the compressed header of the packet has not been received by a given network tool of the plurality of network tools; and upon determining that the compressed header of the packet has not been received by the given network tool of the plurality of network tools, replacing the compressed header with a decompressed header prior to transmitting the packet to the given network tool of the plurality of network tools.

16. The method of claim 13, wherein the plurality of packets includes a first packet and a second packet, the method further comprising: determining, based on the mapping structure, that the compressed header of the first packet has not been received by a given network tool of the plurality of network tools and that the compressed header of the second packet has been received by the given network; upon determining that the compressed header of the first packet has not been received by the given network tool, replacing the compressed header of the first packet with a first decompressed header prior to transmitting the first packet to the given network tool; and upon determining that the compressed header of the second packet has been received by the given network tool, transmitting the second packet to the given network tool, wherein the second packet includes a second compressed header.

17. The method of example 13, wherein the plurality of packets is communicated in a first transmission control protocol (TCP) session using hypertext transfer protocol (HTTP) two, and wherein the plurality of data packets is a first plurality of data packets and the mapping structure is a first mapping structure, the method further comprising: receiving a second plurality of data packets at the visibility node via a second TCP session; determining that the second TCP session is different from the first TCP session; and establishing a second mapping structure corresponding to the second plurality of data packets.

18. The method of example 13, wherein the plurality of packets includes data representative of video, IMS voice, and Internet.

19. The method of example 13, further comprising: encoding at least a portion of the compressed header by applying Huffman encoding schemes.

20. The method of example 13, wherein the mapping structure is further indicative of which packet headers, if any, each of the plurality of tools ports has received.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A network visibility node comprising:
a network port through which to receive a plurality of packets from at least one entity external to the network visibility node, wherein each of the plurality of packets includes a compressed header;
a plurality of tool ports through which to communicate data with a respective plurality of network tools, wherein at least a portion of each packet of the plurality of packets is to be forwarded to at least one network tool of the plurality of network tools;
a storage device storing a mapping structure indicative of which packet headers, if any, each of the plurality of network tools has received; and
processor circuitry configured to
maintain the mapping structure, and
for each packet of the plurality of packets, determine, prior to transmitting the packet to a particular network tool of the plurality of network tools, whether to decompress a compressed header of the packet based on the mapping structure indicative of which packet headers, if any, each of the plurality of network tools has received.

2. The network visibility node of claim 1, wherein the processor circuitry is further configured to, for each packet:
determine, based on the mapping structure, that the compressed header of the packet has not been received by a given network tool of the plurality of network tools; and
upon determining that the compressed header of the packet has not been received by the given network tool of the plurality of network tools, replace the compressed header with a decompressed header prior to transmitting the packet to the given network tool of the plurality of network tools.

3. The network visibility node of claim 1, wherein the processor circuitry is further configured to, for each packet:
   determine, based on the mapping structure, that the compressed header of the packet has been received by a given network tool of the plurality of network tools; and
   upon determining that the given packet header has been received by the given network tool of the plurality of network tools, transmit the packet to the given network tool of the plurality of network tools, wherein the packet includes the compressed header.

4. The network visibility node of claim 1, wherein the processor circuitry is further configured to, for a first packet and a second packet of the plurality of packets:
   determine, based on the mapping structure, that the compressed header of the first packet has not been received by a given network tool of the plurality of network tools and that a compressed header of the second packet has been received by the given network tool;
   upon determining that the compressed header of the first packet has not been received by the given network tool, replace the compressed header of the first packet with a first decompressed header prior to transmitting the first packet to the given network tool; and
   upon determining that the compressed header of the second packet has been received by the given network tool, transmit the second packet to the given network tool, wherein the second packet includes a second compressed header.

5. The network visibility node of claim 1, wherein the plurality of packets is communicated in a transmission control protocol (TCP) session using hypertext transfer protocol (HTTP) version two (HTTP/2).

6. The network visibility node of claim 5, wherein the plurality of packets is received during a single TCP session.

7. The network visibility node of claim 1, wherein the plurality of packets is from a plurality of subscribers.

8. The network visibility node of claim 1, wherein the mapping structure is further indicative of which packet headers, if any, each of the plurality of tool ports has received.

9. The network visibility node of claim 8, wherein the processor circuitry is further configured to, for a first packet and a second packet of the plurality of packets:
   determine, based on the mapping structure, that the compressed header of the first packet has not been received by a given tool port of the plurality of tool ports and that the compressed header of the second packet has been received by the given tool port;
   upon determining that the compressed header of the first packet has not been received by the given tool port, replace the compressed header of the first packet with a first decompressed header prior to transmitting the first packet to the given tool port; and
   upon determining that the compressed header of the second packet has been received by the given tool port, transmit the second packet to the given tool port, wherein the second packet includes a second compressed header.

10. A system comprising:
    a plurality of network ports through which to receive a plurality of packets, wherein each of the plurality of packets includes a compressed header;
    a plurality of tool ports through which to communicate data with a respective plurality of network tools, wherein at least a portion of each packet of the plurality of packets is to be forwarded to at least one network tool of the plurality of network tools;
    a storage device storing a mapping structure indicative of which packet headers, if any, each of the plurality of network tools has received; and
    processor circuitry configured to maintain the mapping structure and for each packet of the plurality of packets, the processor circuitry further configured to:
       determine, based on the mapping structure, whether the compressed header of the packet has been received by a given network tool of the plurality of network tools; and
       upon determining that the compressed of the packet has been received by the given network tool of the plurality of network tools, transmitting the packet to the given network tool of the plurality of network tools, wherein the packet includes the compressed header; or
       upon determining that the compressed header of the packet has not been received by the given network tool of the plurality of network tools, replace the compressed header with a decompressed header prior to transmitting the packet to the given network tool of the plurality of network tools.

11. The system of claim 10, wherein the plurality of packets is from a plurality of subscribers.

12. The system of claim 10, wherein the processor circuitry is further configured to apply a Huffman decoding scheme.

13. A method comprising:
    receiving a plurality of packets at a visibility node, via a network port of a plurality of network ports of the visibility node, the visibility node having a plurality of tool ports through which to communicate data with a respective plurality of network tools, wherein each of the plurality of packets includes a compressed header, and wherein at least a portion of each packet of the plurality of packets is to be forwarded to at least one network tool of the plurality of network tools;
    maintaining, by the visibility node, a mapping structure indicative of which packet headers, if any, each of the plurality of network tools has received; and
    for each packet of the plurality of packets,
       determining, by the visibility node prior to transmitting the packet to a particular network tool of the plurality of network tools, whether to decompress a compressed header of the packet based on the mapping structure indicative of which packet headers, if any, each of the plurality of network tools has received.

14. The method of claim 13, further comprising:
    determining, based on the mapping structure, that the compressed header of the packet has been received by a given network tool of the plurality of network tools; and
    upon determining that the given packet header has been received by the given network tool of the plurality of network tools, transmitting the packet to the given network tool of the plurality of network tools, wherein the packet includes the compressed header.

15. The method of claim 13, further comprising:
    determining, based on the mapping structure, that the compressed header of the packet has not been received by a given network tool of the plurality of network tools; and upon determining that the compressed header of the packet has not been received by the given network tool of the plurality of network tools, replacing the compressed header with a decompressed header prior to transmitting the packet to the given network tool of the plurality of network tools.

16. The method of claim 13, wherein the plurality of packets includes a first packet and a second packet, the method further comprising:
determining, based on the mapping structure, that the compressed header of the first packet has not been received by a given network tool of the plurality of network tools and that a compressed header of the second packet has been received by the given network;
upon determining that the compressed header of the first packet has not been received by the given network tool, replacing the compressed header of the first packet with a first decompressed header prior to transmitting the first packet to the given network tool; and
upon determining that the compressed header of the second packet has been received by the given network tool, transmitting the second packet to the given network tool, wherein the second packet includes a second compressed header.

17. The method of claim 13, wherein the plurality of data packets is communicated in a first transmission control protocol (TCP) session using hypertext transfer protocol (HTTP) two, and wherein the plurality of data packets is a first plurality of data packets and the mapping structure is a first mapping structure, the method further comprising:
receiving a second plurality of data packets at the visibility node via a second TCP session;
determining that the second TCP session is different from the first TCP session; and
establishing a second mapping structure corresponding to the second plurality of data packets.

18. The method of claim 13, wherein the plurality of packets includes data representative of video, IMS voice, and Internet.

19. The method of claim 13, further comprising:
encoding at least a portion of the compressed header by applying Huffman encoding schemes.

20. The method of claim 13, wherein the mapping structure is further indicative of which packet headers, if any, each of the plurality of tool ports has received.

* * * * *